United States Patent
Kratzer

(10) Patent No.: US 7,726,628 B2
(45) Date of Patent: Jun. 1, 2010

(54) MAGNET VALVE HAVING FIXATION MEANS FOR THE RETURN SPRING MOUNTED ON THE VALVE SEAT

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 11/656,936

(22) Filed: Jan. 24, 2007

(65) Prior Publication Data
US 2007/0170386 A1   Jul. 26, 2007

(30) Foreign Application Priority Data
Jan. 24, 2006 (DE) .................. 10 2006 003 252

(51) Int. Cl.
*F16K 31/06* (2006.01)

(52) U.S. Cl. ................. 251/129.02; 251/337; 303/119.2

(58) Field of Classification Search ............ 251/129.15, 251/129.02, 337; 303/119.2, 119.3
See application file for complete search history.

(56) References Cited

U.S. PATENT DOCUMENTS

| | | | | |
|---|---|---|---|---|
| 5,076,538 A | * | 12/1991 | Mohr et al. ............ | 251/129.02 |
| 5,167,442 A | * | 12/1992 | Alaze et al. ............ | 251/129.02 |
| 5,649,748 A | * | 7/1997 | Oehler et al. ............ | 303/119.2 |
| 5,803,556 A | * | 9/1998 | Weis et al. ............... | 303/119.2 |
| 5,836,334 A | * | 11/1998 | Mittwollen et al. .... | 251/129.02 |
| 6,124,775 A | * | 9/2000 | Linkner, Jr. ............ | 251/129.15 |
| 6,276,764 B1 | * | 8/2001 | Park ........................ | 303/119.2 |
| 6,322,049 B1 | * | 11/2001 | Hofmann et al. ........ | 251/129.15 |
| 6,439,265 B1 | * | 8/2002 | Gruschwitz et al. .... | 251/129.02 |
| 6,644,623 B1 | * | 11/2003 | Voss et al. ............. | 251/129.15 |
| 6,994,406 B1 | * | 2/2006 | Krawczyk et al. ......... | 303/119.2 |
| 2004/0262559 A1 | * | 12/2004 | Shibata .................. | 251/129.15 |

* cited by examiner

*Primary Examiner*—John Bastianelli
(74) *Attorney, Agent, or Firm*—Ronald E. Greigg

(57) ABSTRACT

This disclosure teaches a magnet valve, having a valve insert and a tappet which is guided movably via a tappet guide in the valve insert and which is braced via a restoring spring on a valve body, and the restoring spring acts between a first contact face of the tappet and a second contact face on the valve body. According to the invention, fixation means which define a position of the restoring spring relative to the tappet and the valve body are disposed on the second contact face of the valve body.

16 Claims, 2 Drawing Sheets

MAGNET VALVE HAVING FIXATION MEANS FOR THE RETURN SPRING MOUNTED ON THE VALVE SEAT

REFERENCE TO FOREIGN PATENT APPLICATION

This application is based on German Patent Application No. 10 2006 003 252.7 filed 24 Jan. 2006, upon which priority is claimed.

BACKGROUND OF THE INVENTION

1. Field of the Invention

The invention is directed to an improved magnet valve of the type used, for example, in hydraulic fluid systems.

2. Description of the Prior Art

A conventional magnet valve, in particular for a hydraulic unit, which is used for instance in an antilock brake system (ABS) or a traction control system (TCS) or an electronic stability program system (ESP system), is shown in FIG. 1. As can be seen from FIG. 1, besides a magnet unit 5 with a cover disk 12, the conventional magnet valve 20, which is open when without current, includes a valve cartridge that in turn includes a capsule 6, a valve insert 1, a tappet 2, a restoring spring 3, and an armature 7. In the production of the magnet valve 20, the capsule 6 and the valve insert 1 of the valve cartridge are joined together by pressing, and by means of a sealing weld 8, the valve cartridge is sealed off hydraulically from the atmosphere. In addition, the valve insert 1 absorbs the pressure forces that occur in the hydraulic system and carries them via a calked flange 9 to a calking region, not shown, on a fluid block. In addition, the valve insert 1 receives the so-called valve body 4, which includes a valve seat 10 into which the tappet 2 plunges in sealing fashion, in order to perform the sealing function of the magnet valve 20. The tappet 2 includes an axial guide face 2.1, a spring guide 2.2, onto which the restoring spring 3 is slipped and guided radially inward in the short region of the spring guide 2.2, a tappet cone 2.3, a transition region 2.4, and a tappet dome 2.5, which plunges in sealing fashion into the valve insert 1. As also seen from FIG. 1, the tappet 2 and the restoring spring 3 are guided in the valve insert 1; the tappet 2 is guided in a tappet guide 11, and the restoring spring 3 is guided radially from inside and centered on one end on the spring guide 2.2 of the tappet 2 and rests on the first contact face 2.1 of the tappet 2, and on the other end rests, axially guided, on the valve body 4 on a second contact face 4.1. No provision for further fixation or centering of the restoring spring 3 at its installation site is provided. The flow path of the fluid through the magnet valve extends via the restoring spring 3, so that the spring force of the restoring spring 3 is operative in the region of the flow forces which because of the flow are capable of acting on the turns of the restoring spring 3. If the order of magnitude of the spring force and the order of magnitude of the stiffness of the restoring spring 3 are within the range of the forces of the flow acting on the spring turns, then an unwanted influence on the spring behavior can occur from the flow. Hence the restoring spring 3 may for instance lift from its contact with the valve body 4, which may be associated with a corresponding (force) action on the valve tappet 2 and an unwanted influence on the valve function. Moreover, the unguided portion of restoring spring can be laterally deflected or shifted, so that contact and hence frictional forces can occur between the valve insert 1 and the tappet 2. Because of the frictional forces generated, the valve behavior can be adversely affected, and the tappet 2 may be damaged by the spring ends, which may have burrs on them.

OBJECT AND SUMMARY OF THE INVENTION

The magnet valve of the invention has the advantage over the prior art that fixation means are disposed on a contact face of a valve body and define a position of a restoring spring relative to a tappet and the valve body. Because of the radial guidance and/or fixation of the restoring spring on the valve body, it is advantageously possible to prevent flow forces, which act on the turns of the restoring spring, from being able to cause lateral shifting of the restoring spring, or the restoring spring can be prevented from being able to lift from a contact, or the turns of the restoring spring can be prevented from being put into motion relative to one another or set to vibrating. In particular, by the fixation means, a spring end resting only axially on the valve body is centered and stabilized, without adversely affecting the capability of assembling and adjusting the magnet valve. Moreover, advantageously, any existing degrees of freedom in the spring position and spring location can be defined, and thus associated static and dynamic effects such as vibration, radial deflections, and the like, and their effects on surrounding components, can be favorably influenced. In particular, tappet wear that occurs when the comparatively hard restoring spring, which is made for instance from steel, moves rotationally relative to the soft tappet, which is made for instance of plastic, can be reduced. In addition, the defined position of the restoring spring means that the closed-/open-loop control behavior of the magnet valve of the invention can be determined more precisely in advance, and deviations inside the valve, which can occur in different work cycles of the valve, can be reduced. Moreover, the deviations between various valves of the same type can advantageously be reduced.

By the provisions and refinements disclosed, advantageous improvements to the magnet valve disclosed in the independent claim are possible. It is especially advantageous that the fixation means are connected by nonpositive engagement and/or positive engagement to the valve body via fastening means, so that lifting of the fixation means caused by flow forces can be prevented. For instance, the fixation means have a bottom disk, with an upward-standing collar in which one end, contacting the second contact face of the valve body, of the restoring spring is guided and/or fixed.

In a feature of the magnet valve of the invention, the bottom disk of the fixation means is connected by nonpositive engagement and/or positive engagement to the valve body via the fastening means, and the fastening means include at least one detent lug and at least one detent indentation. The at least one detent lug and the at least one detent indentation are for instance embodied as a clip connection and/or a snap connection, and as a result the fastening of the fixation means on the valve body is advantageously improved. The fixation means are for instance embodied as a plastic injection-molded part, making economical production possible.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
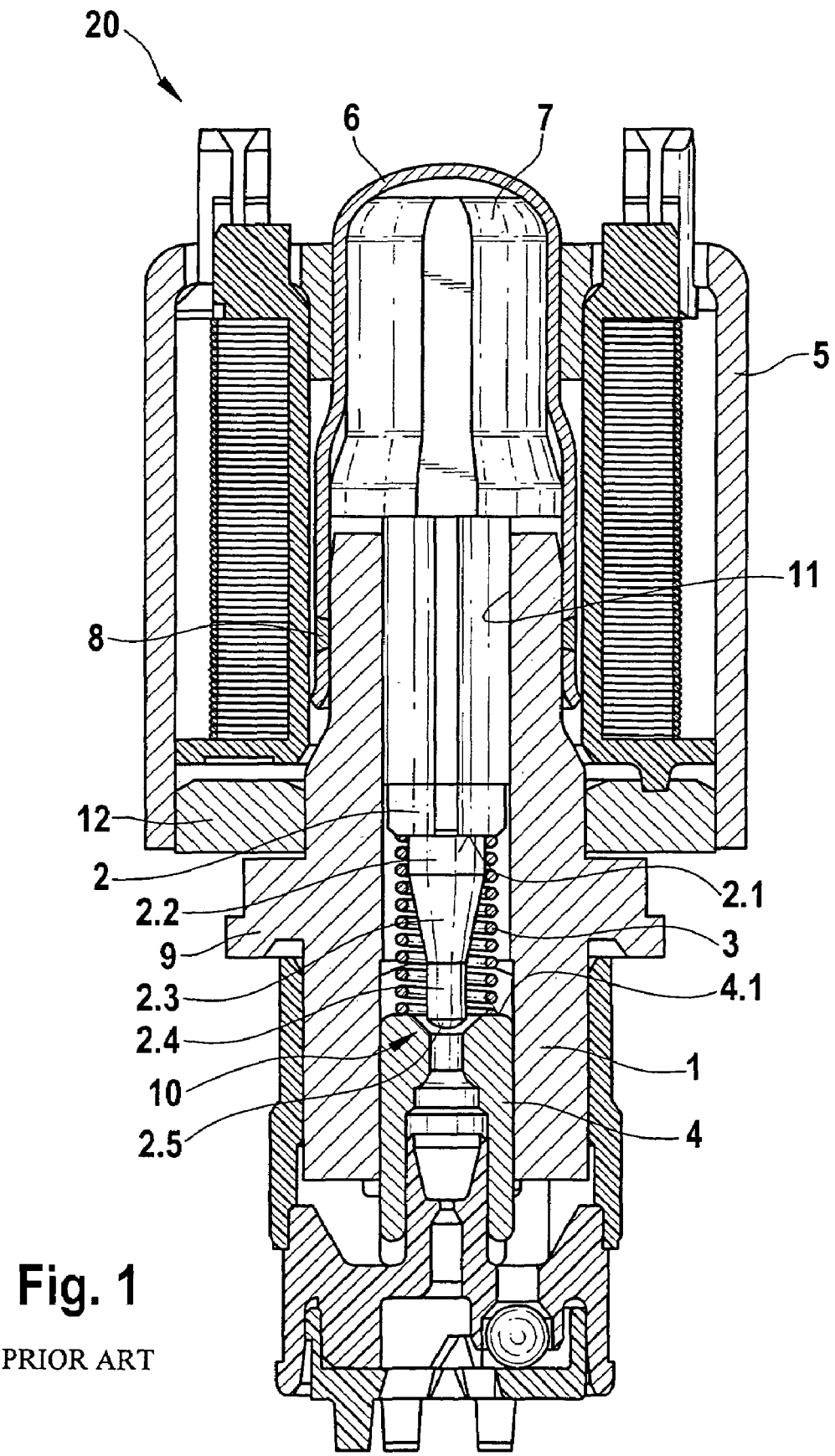
FIG. 1 is a schematic sectional view of a conventional magnet valve.
Figure 2:
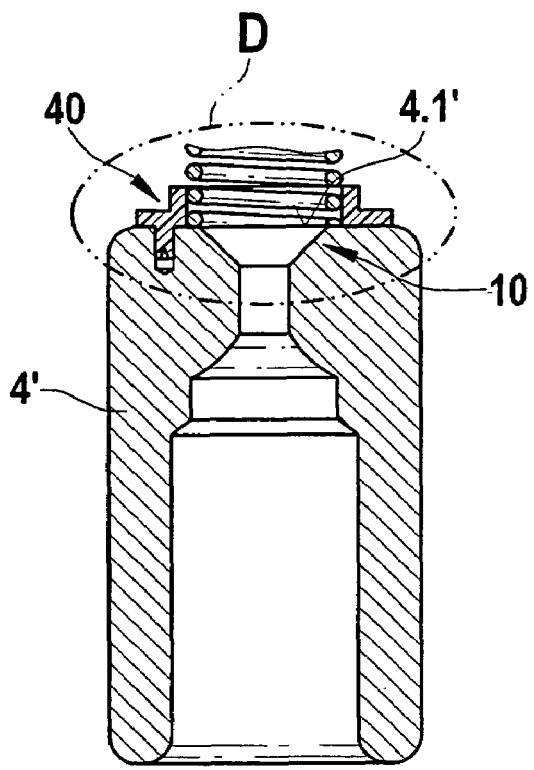
FIG. 2 is a schematic sectional view of a valve body of the invention for the magnet valve of FIG. 1.
Figure 3:
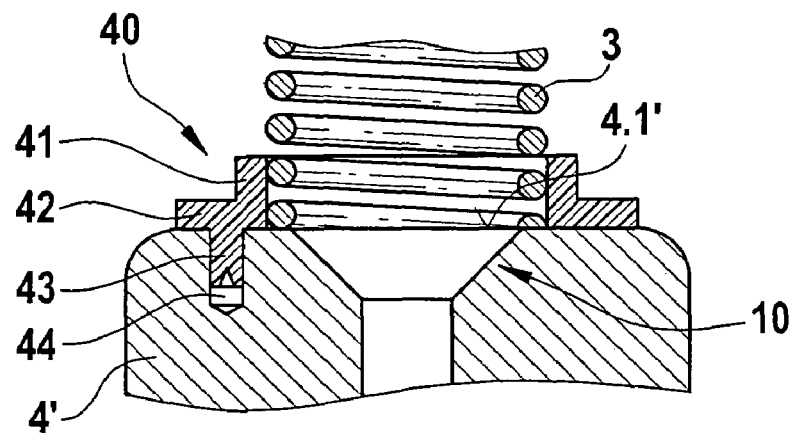
FIG. 3 is a schematic sectional view of a detail D of FIG. 2.

FIGS. 2 and 3 show a valve body 4' of the invention, which replaces the conventional valve body 4 in a magnet valve 20 of FIG. 1. As can be seen from FIGS. 2 and 3, the valve body 4' for the magnet valve 20 includes fixation means 40, which for guiding and/or fixation of a restoring spring 3 are disposed on a contact face 4.1' of the valve body 4'. The restoring spring 3 is slipped onto a tappet 2, which is guided movably in a valve insert 1 of the magnet valve 20 via a tappet guide 11, and which rests with one end on a first contact face 2.1 of the tappet 2. The restoring spring 3 is guided radially from inside and centered on this end in the short region of a spring guide 2.2 of the tappet 2. On the other end, the restoring spring 3 is centered and guided by the fixation means 40 on the second contact face 4.1' of the valve body 4', so that the position of the restoring spring 3 is definable.

As can be seen from FIG. 3, the fixation means 40 include a bottom disk 42, with an upward-standing collar 41 in which the end of the restoring spring 3 contacting the second contact face 4.1' of the valve body 4' is guided and/or fixed. Because of the radial guidance and/or fixation of the restoring spring 3 on the valve body 4', any existing degrees of freedom in the spring position and location can be defined and thus associated static and dynamic effects, such as vibration, radial deflections, and so forth, and their effects on surrounding components can be favorably influenced. The fixation means 40 are embodied for instance as a plastic injection-molded part and are connected by nonpositive engagement and/or positive engagement to the valve body 4' via fastening means 43, 44. In the exemplary embodiment shown, the bottom disk 42 of the fixation means 40 is connected to the valve body 4' by nonpositive engagement and/or positive engagement via the fastening means, which include a detent lug 43, disposed on the bottom disk 42, and a detent indentation 44, introduced into the valve body 4'. In addition, the detent lug 43 and the detent indentation 44 are embodied as a clip connection and/or as a snap connection.

The foregoing relates to preferred exemplary embodiments of the invention, it being understood that other variants and embodiments thereof are possible within the spirit and scope of the invention, the latter being defined by the appended claims.

I claim:

1. A magnet valve, having a valve seat (10) and a tappet (2) guided movably in the valve seat via a tappet guide (11), a valve body (4') and a restoring spring (3) disposed on the valve body (4') between a first contact face (2.1) on the tappet (2) and a second, flat contact face (4.1') of the valve body (4'), characterized in that fixation means (40) are disposed on the second, flat contact face (4.1') of the valve body (4'), which fixation means (40) define a position of the restoring spring (3) relative to the tappet (2) and to the valve body (4'), which position is inside the fixation means, and the second, flat contact face (4.1') for the restoring spring (3) is embodied by the end face, closer to the tappet (2), of the valve body (4').

2. The magnet valve as defined by claim 1, wherein the fixation means are connected by nonpositive engagement and/or positive engagement to the valve body via fastening means.

3. The magnet valve as defined by claim 1, wherein the fixation means comprises a bottom disk having an up-standing collar in which one end of the restoring spring is guided and/or fixed into a position of engagement with the contact face of the valve body.

4. The magnet valve as defined by claim 2, wherein the fixation means comprises a bottom disk having an up-standing collar in which one end of the restoring spring is guided and/or fixed into a position of engagement with the contact face of the valve body.

5. A magnet valve, having a valve seat (10) and a tappet (2) guided movably in the valve seat via a tappet guide (11), a valve body (4') and a restoring spring (3) disposed on the valve body (4') between a first contact face (2.1) on the tappet (2) and a second contact face (4.1') of the valve body (4'), characterized in that fixation means (40) are disposed on the second contact face (4.1') of the valve body (4'), which fixation means (40) define a position of the restoring spring (3) relative to the tappet (2) and to the valve body (4'), and the second contact face (4.1') for the restoring spring (3) is embodied by the end face, closer to the tappet (2), of the valve body (4'), wherein the fixation means comprises a bottom disk having an up-standing collar in which one end of the restoring spring is guided and/or fixed into a position of engagement with the contact face of the valve body, and wherein the bottom disk of the fixation means is connected by nonpositive engagement and/or positive engagement to the valve body via fastening means, and wherein the fastening means includes at least one detent lug on the bottom disk which is inserted into at least one detent indentation in the valve body.

6. A magnet valve, having a valve seat (10) and a tappet (2) guided movably in the valve seat via a tappet guide (11), a valve body (4') and a restoring spring (3) disposed on the valve body (4') between a first contact face (2.1) on the tappet (2) and a second contact face (4.1') of the valve body (4'), characterized in that fixation means (40) are disposed on the second contact face (4.1') of the valve body (4'), which fixation means (40) define a position of the restoring spring (3) relative to the tappet (2) and to the valve body (4'), and the second contact face (4.1') for the restoring spring (3) is embodied by the end face, closer to the tappet (2), of the valve body (4'), wherein the fixation means are connected by nonpositive engagement and/or positive engagement to the valve body via fastening means, wherein the fixation means comprises a bottom disk having an up-standing collar in which one end of the restoring spring is guided and/or fixed into a position of engagement with the contact face of the valve body, and wherein the bottom disk of the fixation means is connected by nonpositive engagement and/or positive engagement to the valve body via the fastening means, and wherein the fastening means includes at least one detent lug on the bottom disk which is inserted into at least one detent indentation in the valve body.

7. The magnet valve as defined by claim 5, wherein the at least one detent lug and the at least one detent indentation are embodied as a clip connection and/or a snap connection.

8. The magnet valve as defined by claim 6, wherein the at least one detent lug and the at least one detent indentation are embodied as a clip connection and/or a snap connection.

9. The magnet valve as defined by claim 1, wherein the fixation means are embodied as a plastic injection-molded part.

10. The magnet valve as defined by claim 2, wherein the fixation means are embodied as a plastic injection-molded part.

11. The magnet valve as defined by claim 3, wherein the fixation means are embodied as a plastic injection-molded part.

12. The magnet valve as defined by claim 4, wherein the fixation means are embodied as a plastic injection-molded part.

13. The magnet valve as defined by claim 5, wherein the fixation means are embodied as a plastic injection-molded part.

14. The magnet valve as defined by claim 6, wherein the fixation means are embodied as a plastic injection-molded part.

15. The magnet valve as defined by claim 7, wherein the fixation means are embodied as a plastic injection-molded part.

16. The magnet valve as defined by claim 8, wherein the fixation means are embodied as a plastic injection-molded part.

* * * * *